Sept. 13, 1955     E. LAMMERZ     2,717,523
CHANGE SPEED TRANSMISSION
Filed Oct. 4, 1950     3 Sheets-Sheet 2
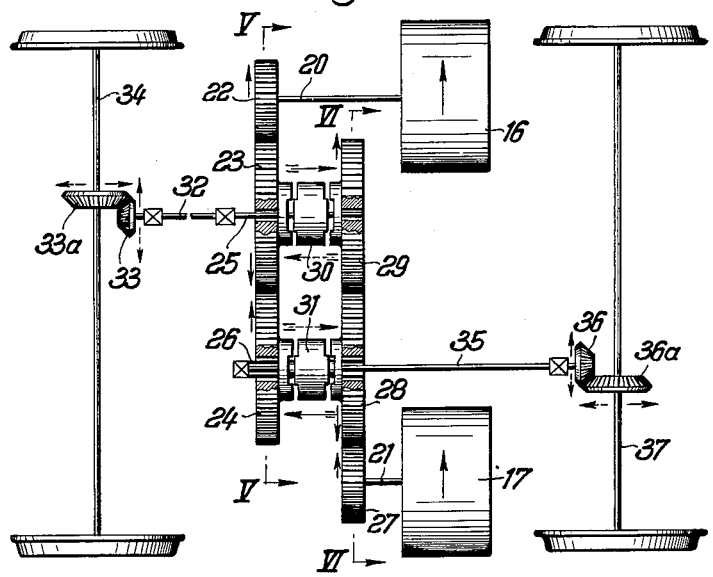
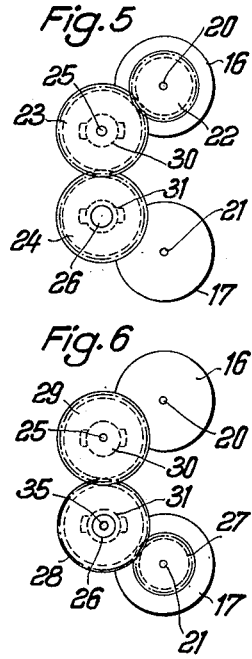
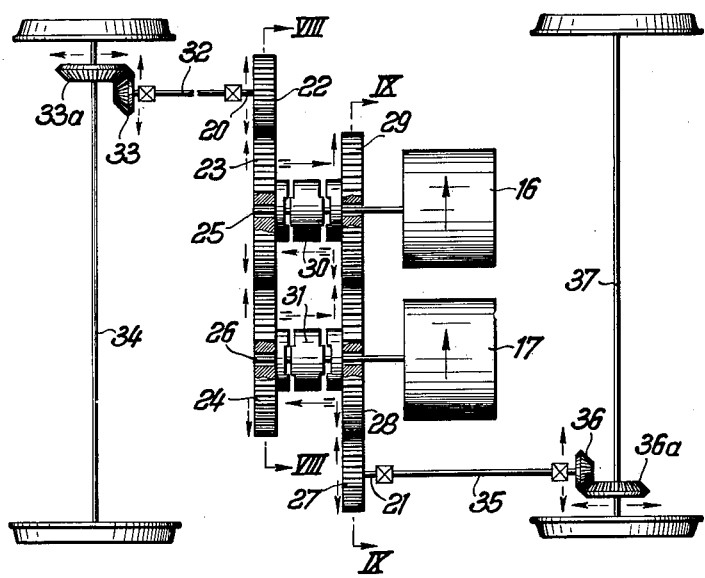
Inventor:
ERNST LAMMERZ
BY Toulmin & Toulmin
ATTORNEYS Sept. 13, 1955     E. LAMMERZ     2,717,523
CHANGE SPEED TRANSMISSION
Filed Oct. 4, 1950                                                    3 Sheets-Sheet 3
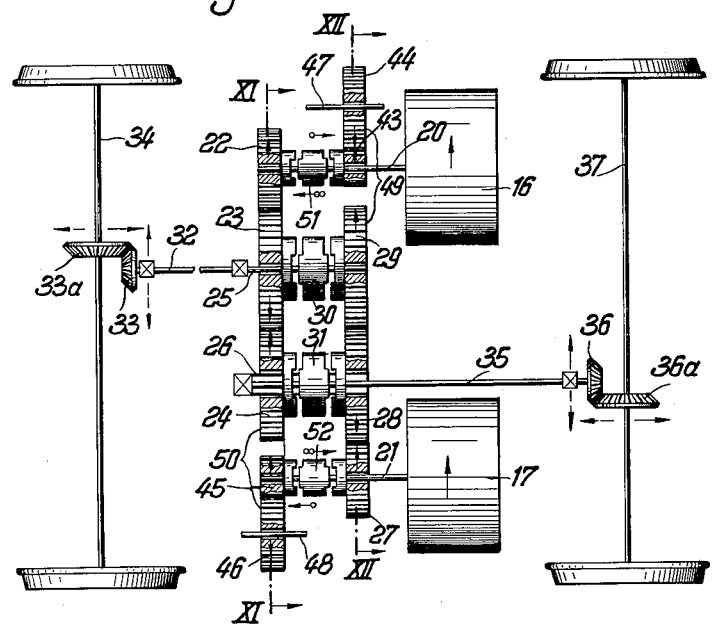
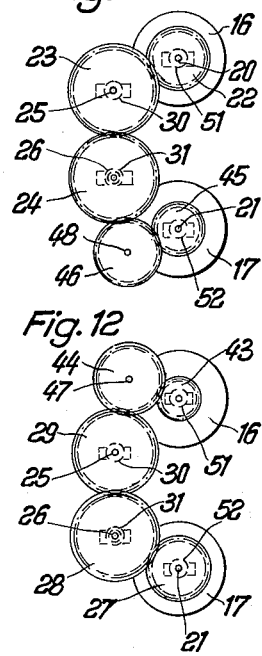
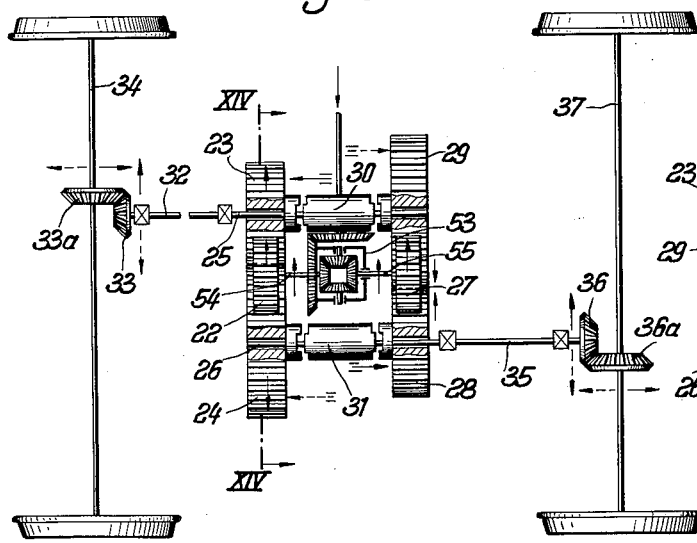
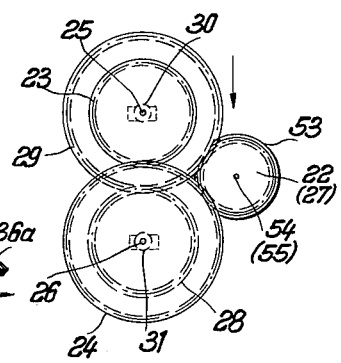
*Inventor:*
ERNST LAMMERZ
BY Toulmin & Toulmin
ATTORNEYS United States Patent Office 2,717,523
Patented Sept. 13, 1955

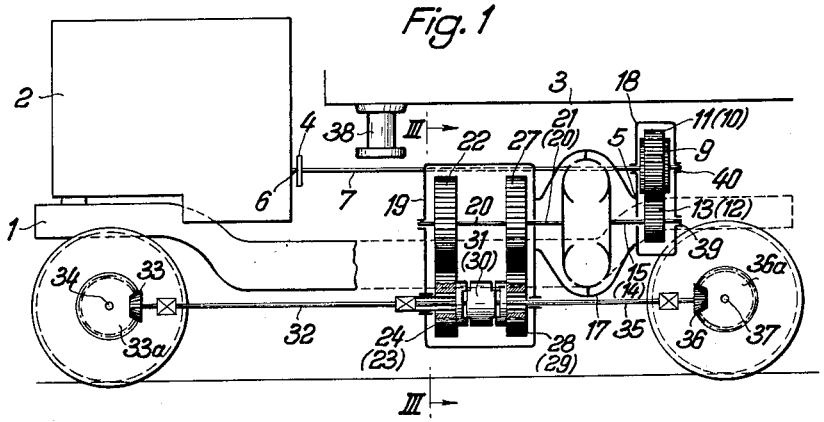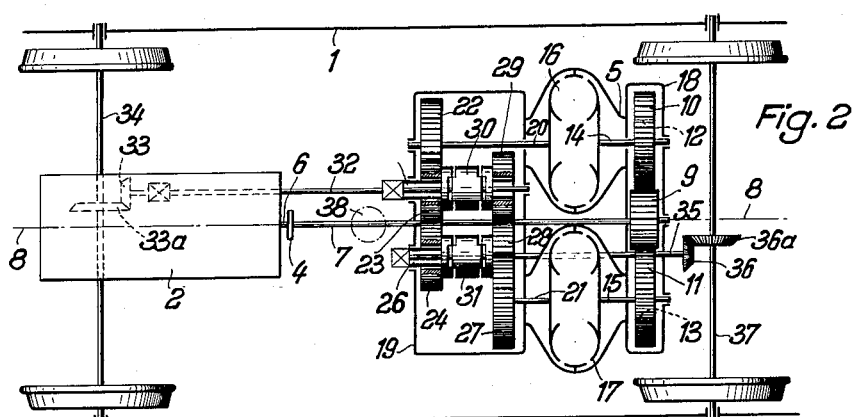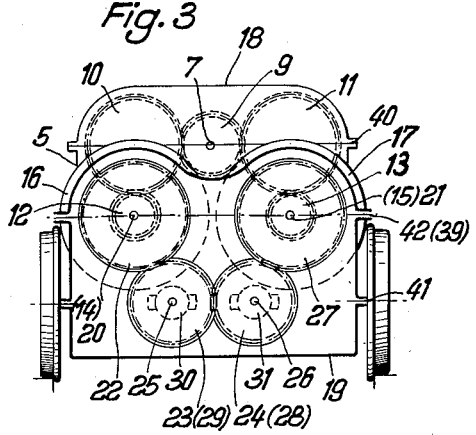

2,717,523
CHANGE SPEED TRANSMISSION

Ernst Lammerz, Essen, Germany, assignor to Fried. Krupp Lokomotivfabrik, Essen, Germany Application October 4, 1950, Serial No. 188,447

Claims priority, application Germany October 7, 1949

6 Claims. (Cl. 74—665)

The present invention relates to power transmissions for vehicles, especially rail vehicles, in which the axles of at least one pair of axles are driven by separate non-reversible driving means as, for instance, turbines, internal combustion engines, fluid drives, etc. For the purpose of this invention, the term "pair of axles" is to be interpreted also to cover pairs of axle groups formed by at least two axles coupled with each other.

It is an object of this invention to provide an improved power transmission which can be arranged in a relatively small space and which, although not limited to, will be of particular advantage in connection with such vehicles of the above-mentioned type in which the driving means, for instance steam turbines, are arranged side by side and rotate in the same direction, or in which the wheel base of the driven axles is short.

It is another object of this invention to provide a power transmission for vehicles of the abovementioned type in which the gears forming the transmission pertaining to one axle of a pair of axles are identical to the gears pertaining to the transmission of the other axle of said pair of axles so that the gears can be easily exchanged, while the manufacture of the power transmission is materially simplified and can be effected at reduced cost.

It is still another object of this invention to provide a power transmission for vehicles in which at least one pair of axles is driven by separate fluid drives which latter may easily be exchanged so that each fluid drive may be used for driving the front or rear axle.

These and other objects and advantages of the invention will appear more clearly from the following specification in connection with the accompanying drawings in which:

Figure 1 diagrammatically illustrates a longitudinal view partly in section of a rail vehicle truck showing one embodiment of the present invention.

Figure 2 is a top view of the arrangement shown in Figure 1.

Figure 3 illustrates on a somewhat larger scale than that used in Figures 1 and 2 a section taken along the line III—III of Figure 1.

Figure 4 represents on a still different scale a plan view of the gear arrangement of Figure 1, however, with the gears shown developed.

Figures 5 and 6 represent on a scale reduced with regard to that of Figure 4 sections taken along the lines V—V and VI—VI of Figure 4. However, the gears in these views are not developed, while the gears outside the section plane have been omitted.

Figures 7, 8 and 9 represent in a manner similar to that of Figures 4 to 6 a further embodiment of the present invention.

A still further embodiment of the present invention with two speeds for forward and rearward drive is shown in Figures 10, 11 and 12 in a manner similar to that illustrated in Figures 4, 5 and 6.

Figure 13 illustrates a fourth embodiment of the present invention which makes use of a differential transmission by means of which a single input shaft can drive two other shafts that form the driving means.

Figure 14 represents a section taken along the line XIV—XIV of Figure 13.

Finally, Figure 15 shows the two speed feature of Figure 7 applied to the arrangement of Figure 10.

General arrangement

The power transmission according to the present invention is, as stated above, used in connection with vehicles having at least one pair of axles driven by non-reversible driving means. The arrangement is such that the separate non-reversible driving means are drivingly connected with two, preferably parallel, shafts respectively, each of which has freely rotatably mounted thereon two gears, of which one gear may be clutched to the respective shaft for the forward drive, while the other gear may be connected to the said shaft for rearward drive. Thus, each non-reversible driving means will drive the axle for forward drive and a different axle for the rearward drive.

One of the characteristic features of the present invention consists in that the gears, located on one end of the same side of the two shafts, are in direct and permanent engagement with each other. Preferably, one of the gears located at one side of the two shafts additionally and permanently engages a further gear drivingly connected with one of the driving means. According to a modification of the invention, one of the gears located at one side of the shafts is in permanent engagement with the gear drivingly connected to one of the axles of the respective pairs of axles.

When the two parallel shafts are in alignment with or, also, represent the shafts driving the axles (Figures 4 and 10), one of the gears, located at one side of the arrangement, engages a gear driven by the driving means.

When, on the other hand, the two parallel shafts are in alignment with or represent the driving shafts of the driving means (Figure 7), one of the gears, located at one side of the arrangement, permanently engages a gear which drives an axle. When two shafts of a differential transmission rotate in the same direction and form the driving means (Figure 13), the gears mounted on the parallel shafts are arranged on opposite front sides of the differential transmission. Each of the two parallel shafts then leads to one driven vehicle axle.

Structural arrangement

Referring now to the drawings in detail and Figures 1 to 6 thereof in particular, the arrangement shown therein comprises on the left half of a truck 1 a longitudinally mounted diesel engine 2, the upper part of which extends through an aperture provided in the floor 3 of a vehicle not shown in the drawings. The motor 2 is connected through a clutch 4 with a transmission block 5 arranged on the right half of the truck. An extension shaft 7 driven by the crankshaft 6 of the motor 2 through the clutch 4 is mounted in the vertical longitudinal center plane 8 of the truck. The shaft 7 extends almost up to the right-hand end of the truck and there carries a pinion 9. The pinion 9 is positively connected with two gears 12 and 13 by means of two identical gears 10 and 11 which are arranged at the same level (see Figure 3). The gears 12 and 13 are mounted on the primary shafts 14, 15 of two fluid drives 16 and 17. If the diesel engine 2 represents an 800 horsepower motor, the fluid drives 16 and 17 may each be built for 400 horsepower.

The speed increasing mechanical primary gear stages 9, 10, 12 and 9, 11, 13 are mounted in a casing 18 which, in the direction toward the motor, is followed by the fluid drives 16 and 17. Connected to the fluid drives 16 and 17 is a transmission casing 19, housing a mechanical shiftable secondary gear transmission. This transmission is driven by the secondary shafts 20, 21 of the fluid drive 16, 17. The secondary shafts 20, 21 rotate in the same direction and are of different length, while forming the driving means in the meaning of the present invention.

Mounted at the free end of the long secondary shaft 20, pertaining to the fluid drive 16, is a gear 22 which is in permanent driving engagement with a gear 23, which latter permanently engages a gear 24. The gears 23 and 24 are of the same size and are freely rotatably mounted on two parallel shafts 25 and 26, located at a lower level than the shaft 20.

Similarly, the free end of the short secondary shaft 21, pertaining to the fluid drive 17, has mounted thereon a gear 27 which permanently engages a gear 28, permanently engaging in its turn, the gear 29. The gears 28 and 29 are freely rotatably mounted on the shafts 26 and 25 respectively. The gears of both gear pairs 23, 24 and 28, 29 are of equal size. Non-rotatably connected to, but slidably mounted on the two parallel shafts 25, 26 are two coupling sleeves 30, 31 respectively adapted by means of the jaws arranged at both sides thereof to engage corresponding jaws provided on gears 23, 24 and 28, 29 respectively.

The left (with regard to Figure 3) shaft 25 is connected with the left driven axle 34 by means of a drive shaft 32 and a bevel gear pair 33, 33a. The right-hand shaft 26 is constructed as a hollow shaft. That end of the shaft 26 which faces the axle 34 is positively connected with the right driven axle 37 in a corresponding manner, i. e., through a drive shaft 35 and a bevel gear pair 36, 36a. Consequently, the drive shafts 32, 35 may be of the same length and may be of approximately half the wheel base of the axles 34, 37. The transmission block 5, comprising the primary gear stage, the fluid drive and the secondary gear transmission, extends approximately from the right driven axle 37 which may be assumed to be the front axle when driving forwardly, up to the pivot 38 of the truck. The casing 18 for the primary gear stage has two horizontal separating seams 39, 40, while the casing 19 for the secondary gear transmission has two horizontal separating seams 41, 42 (see Figure 3). The separating seams are located in the planes of the axes of the gear shafts. The seams 39 and 42 are located in the same plane.

In Figure 4 the direction in which the coupling sleeves 30, 31 are moved for effecting the forward drive is indicated by solid feathered arrows, whereas the direction of movement of the coupling sleeves 30, 31 for rearward drive is indicated by dashed feathered arrows. The direction of revolution of the gears, which remains the same with the forward and the rearward drive, is indicated by arrows without feathers. It will be noticed that the coupling sleeves 30, 31, in order to effect a change in the driving direction, are moved in opposite direction and then will drive different axles. When driving forwardly, the coupling sleeve 30 engages the pinion 29, while the coupling sleeve 31 engages the pinion 24. The fluid drive 16 drives the hollow shaft 26 through gears 22, 23, 24 and the coupling sleeve 31. The hollow shaft 26 then drives the axle 37 through drive shaft 35 and bevel gears 36, 36a. The fluid drive 17 drives the shaft 25 through gears 27, 28, 29 and the coupling sleeve 30. The shaft 25 conveys its rotation to the then rear axle 34 through the drive shaft 32 and the bevel gears 33, 33a.

When driving rearwardly, the coupling sleeve 30 engages the gear 23, while the coupling sleeve 31 engages the gear 28. The driving power is then conveyed as follows:

The fluid drive 16 drives shaft 25 through gears 22, 23 and coupling sleeve 30. The shaft 25, in its turn, drives the now front axle 34 through the drive shaft 32 and the bevel gears 33, 33a. On the other hand, the fluid drive 17 drives through gears 27, 28 and coupling sleeve 31, the hollow shaft 26 which conveys its torque through drive shaft 35 and bevel gears 36, 36a to the now rear axle 37. It will be clear that, when the driving direction is changed, the axles driven by the fluid drives 16, 17 are exchanged.

It will be noted that one of the gears 23, 24 and 28, 29, located at one side of the parallel shafts 25, 26, permanently engages with the gears 22 and 27 respectively driven by the fluid drives 16, 17. This one gear at one side is the gear 23 while, at the other side, the corresponding gear is the gear 28. The gears 22, 23, 24 and 27, 28, 29 respectively located on one side of the shafts 25 and 26 form blocks of three which are shown in detail in Figures 5 and 6.

In the arrangement shown in Figures 4 to 6, the drive shafts 32 and 35 are connected to the two parallel shafts 25 and 26 respectively, while one gear 22 and 27 respectively of the blocks 22, 23, 24 and 27, 28, 29 is driven by the fluid drive 16, 17. The arrangement of Figures 7 to 9 differs from the arrangement of Figures 4 to 6 primarily in that the two parallel shafts 25, 26 respectively are driven by the fluid drive 16 and 17, whereas the third wheel 22 and 27 respectively of the three gear blocks drives the driving shaft 32 and 35 respectively. A hollow shaft is not necessary in this arrangement. The two coupling sleeves 30, 31 are again arranged between the gears 23, 29 and 24, 28 respectively. However, while with the arrangement of Figures 4 to 6, the direction of rotation of the gears 22 to 24 and 27 to 29 remains the same, irrespective of whether forward drive or rearward drive is selected, with the arrangement of Figures 7 to 9, these gears change their direction of rotation when the driving direction is changed.

Similar to the arrangement of Figure 4, Figure 7 indicates the direction of rotation during forward drive by solid arrows without feathered end, while the direction of rotation during the rearward drive is indicated by dashed arrows without feathered ends. The driving directions in Figure 7 are indicated with corresponding arrows provided with a feathered end. The three gear blocks are represented in detail in Figures 8 and 9. The operation of the arrangement of Figure 7 will be obvious, in view of the arrows shown therein.

The third embodiment of the invention shown in Figures 10 to 12 of the drawings is a further development of the embodiment of Figures 1 to 6, inasmuch as two different speeds are provided for each driving direction. More specifically, the arrangement of Figures 10 to 12 differs from that of Figures 4 to 6 primarily in that the gears 22, 27, driven by the fluid drives 16, 17, are freely rotatably mounted on the secondary shafts 20, 21. Furthermore, there is freely rotatably mounted on the shaft 20, opposite the gear 22, a small pinion 43 for effecting the second speed. The pinion 43 meshes with a gear 44 which, in its turn, engages the gear 29. In a corresponding manner, at the other side of the gear block, there is arranged opposite the gear 27 a small pinion 45 which is in permanent driving connection with the gear 24 through a gear 46. The gears 44 and 46 are likewise freely rotatably mounted upon the shafts 47 and 48 respectively. The fact that gears 44 and 46 respectively mesh with the gears 29 and 24 is indicated in the development of Figure 10 by brackets 49, 50. Mounted between the gears 22 and 43, facing each other, and similarly between the gears 27 and 45, are coupling sleeves 51 and 52 respectively corresponding to the coupling sleeves 30 and 31. The coupling sleeves 51 and 52 are provided at both side with jaws adapted to engage corresponding jaws on the gears 22, 43 and 27, 45 respectively to thereby make the two speeds effective.

Figures 11 and 12 show the gear blocks which, in this instance, are blocks of five gears arranged at both sides of the shafts 20 and 21. The direction of rotation of the gears is again indicated by arrows in the manner outlined above in connection with the other figures. However, in order to indicate the direction of shifting the coupling sleeves in connection with the two speeds, the first speed is indicated by arrows with a small circle at the end, whereas the second speed is indicated by arrows with two circles at the end.

As will be clear from the above, this arrangement makes it possible by means of only ten gears to drive two axles individually forwardly and rearwardly at two different speeds. This arrangement may also be used, as with the second example, when the parallel shafts 25, 26 are driven by the fluid drives 16 and 17 and the third wheel 22 and 27 respectively of the original three gear block drives the drive shafts. Figure 15 shows the arrangement of Figure 7 modified in this manner.

While with the embodiments described so far, the two fluid drives 16 and 17 are arranged side by side, the embodiment shown in Figures 13 and 14 discloses an arrangement in which a motor (not shown in the drawing) by means of a fluid drive (likewise not shown) drives a differential transmission 53. The two aligned output shafts 54, 55 of the transmission 53 form the driving means in the meaning of the present invention. In contrast to the embodiments described so far, Figure 13 shows the gear blocks arranged on opposite front sides of the transmission 53. Similar to the first embodiment shown in Figure 4, the two drive shafts 32, 35 are connected to the two parallel shafts 25, 26 respectively on which the gears 23, 24 and 28, 29 are freely rotatably mounted. Thereinbetween, are arranged the coupling sleeves 30 and 31 which are non-rotatably connected to, but slidably mounted on the shafts 25, 26 respectively. In order to prevent the gears 23, 24 and 28, 29 simultaneously to engage the gears 22, 27 respectively mounted on the shafts 54 and 55, the gears 24, 29 are larger by the height of one tooth than the gears 23, 28.

The arrangements according to the present invention are extremely simple in construction and operation and their advantages may be summarized as follows:

*a.* Aside from the bevel gears 33, 33*a* and 36, 36*a* rigidly connected to their respective shafts, only spur wheels are employed.

*b.* In order to drive two axles individually, i. e., independently of each other, in forward and rearward direction, only six spur wheels are needed.

*c.* When two speeds are desired for each the forward and the rearward drive, the number of gears is increased to only ten.

*d.* The front and rear axle including the bevel gears associated therewith are identical in construction so that the same construction elements may be used for both axles. Also the fluid drives are identical and may be exchanged with each other.

*e.* The drives can easily be removed from below.

*f.* If one fluid drive should for some reason become inoperative, the vehicle can still drive in both directions with the other drive.

It is, of course, understood that while the invention has been described in connection with fluid drives as driving means, the principle of the present invention is fully applicable if the fluid drives are replaced by steam turbines or other in the direction of rotation non-reversible driving means.

It is, also, to be understood that the present invention is by no means limited to the specific arrangements shown in the drawings but, also, comprises any modifications within the scope of the appended claims.

What I claim is:

1. A power transmission for use in connection with a vehicle having first and second axles 34, 37 for being individually and reversibly driven which comprises in combination, first and second shafts 25, 26 in Figs. 4, 10, 13; 20, 21 in Figs. 7, 15 parallel to each other and connected with said first and second axles respectively, driving means 16, 17, third and fourth shafts 20, 21 in Figs. 4, 10; 25, 26 in Figs. 7, 15; 54, 55 in Fig. 13 parallel to said first and second shafts being individually and non-reversibly driven both in the same direction of rotation by said driving means, first and second gear trains arranged in spaced parallel planes extending at right angles to said shafts and each comprising at least three constantly meshing gears, at least two gears 23, 24 of said first train being coaxial one by one with corresponding gears 29, 28 of said second train, at least two 25, 26 of said four shafts rotatably supporting said pairs of coaxial gears respectively, the other two 20, 21 in Figs. 4, 7, 10, 15; 54, 55 in Fig. 13 of said four shafts each being drivingly associated with the third gear 22, 27 of one of said gear trains, respectively, clutch means 30, 31 for selectively connecting said first-mentioned two shafts 25, 26 with said pairs of gears thereon to couple said two shafts one with said first gear train and the other with said second gear train thus effecting driving engagement between first and second axles 34, 37 and either said third and fourth shafts respectively in one direction of travel or said fourth and third shafts, respectively, in the opposite direction of travel (Figs. 4, 7, 10, 13, 15).

2. An arrangement as described in claim 1 in which said two pairs of coaxial gears and corresponding clutch means are supported by said first and second shafts, respectively, thus being associated with said first and second axles, 34, 37 respectively (Figures 4, 10, 13, 15).

3. An arrangement as described in claim 1 in which said two pairs of coaxial gears and corresponding clutch means are supported by said third and fourth shafts respectively thus being associated with said driving means 16, 17 respectively (Figs. 7, 10, 13, 15).

4. An arrangement as described in claim 1 which comprises a differential gear transmission 53 including bevel gears arranged in axial alignment with each other and rotating always in one and the same direction, said third and fourth shafts 54, 55 being drivingly connected with said bevel gears of said differential gear transmission (Fig. 13).

5. An arrangement for use in connection with a vehicle having first and second axles 34, 37 for being individually and reversibly driven in at least two different speed stages, which comprises in combination, first and second shafts 25, 26 parallel to each other and connected with said first and second axles 34, 37 respectively, driving means 16, 17, third and fourth shafts 20, 21 parallel to each other and to said first and second shafts and both acting as individually and non-reversibly driven output shafts of said driving means, first and second gear trains arranged in spaced parallel planes extending at right angles to said shafts and each comprising at least five constantly meshing gears, four gears 23, 24, 22, 45 of said first train being coaxial with four gears 29, 28, 43, 27 one by one of said second train, said four shafts 25, 26, 20, 21 rotatably supporting said four pairs of coaxial gears respectively, clutch means 30, 31, 51, 52 for selectively connecting said shafts with said gears thereon to couple one of said axle driving shafts 25, 26 and one of said output shafts 20, 21 with said first gear train and the others of these shafts with said second gear train, thus effecting driving engagement in two different speed stages between said first and second axles 34, 37 and either one or the other of said output shafts 20, 21 in either one or the other direction of travel (Figs. 10, 15).

6. An arrangement for use in connection with a vehicle having first and second axles for being individually and reversibly driven comprising first and second nonreversible driving means arranged side-by-side and with their output shafts extending in the same direction and having the same direction of rotation, first and second gear trains arranged in spaced parallel planes extending at right angles to said output shafts and each comprising at least three meshing gears, two gears of one train being coaxial with two gears of the other train, first and second shafts rotatably supporting the pairs of coaxial gears, clutch means for selectively connecting said shafts with the gears thereon to couple the shafts one with the one gear train and the other with the other gear train, a driving connection from one of said shafts to said first axle, a driving connection from a gear of said first gear train other than one of the said two gears to the said output shaft of said first driving means, a driving connection from said second shaft to said second axle, and a driving connection from a gear of said second gear train other than one of said two gears to the said output shaft of said second driving means.

References Cited in the file of this patent

UNITED STATES PATENTS

| | | |
|---|---|---|
| 1,336,770 | Wittmaack | Apr. 13, 1920 |
| 1,641,253 | Donon | Sept. 6, 1927 |
| 2,280,652 | Lamond | Apr. 21, 1942 |
| 2,305,454 | Nallinger | Dec. 15, 1942 |
| 2,422,173 | Wilson | June 10, 1947 |